UNITED STATES PATENT OFFICE.

EDWARD H. ROBERTS, OF CUB HILL, MARYLAND.

REMEDY FOR HOG-CHOLERA.

SPECIFICATION forming part of Letters Patent No. 360,363, dated March 29, 1887.

Application filed May 7, 1886. Serial No. 201,445. (No specimens.)

*To all whom it may concern:*

Be it known that I, EDWARD H. ROBERTS, a citizen of the United States, residing at Cub Hill, in the county of Baltimore, State of Maryland, have invented certain new and useful Improvements in Hog-Cholera Remedies, of which the following is a specification.

My invention relates to a prescription for the treatment of hog-cholera and other diseases; and it consists of the following ingredients: madder, thirty-two parts; sulphur, thirty-two parts; saltpeter, sixteen parts; black antimony, nine parts, and asafetida, six parts, well compounded, to which are added equal portions of lard, tar, and turpentine sufficient to reduce the whole to an adherent or pasty condition.

The compound is administered in doses of about one table-spoonful to a hog three times a day, and if not relieved, frequent the doses. This compound in its effects is laxative, tonic, and alterative, regulating the bowels, strengthening the system, purifying the blood, and building up and invigorating the constitution generally. These powders are not intended to act as a strong purgative, but as a gentle laxative only, keeping the bowels regular. When a strong purgative is needed, give them in combination with some more active cathartic. If the hog will not eat, drench or mop it down the throat, and continue doing so twice or three times a day until the hog is relieved.

The compound, when prepared for marketable purposes, is placed in metallic vessels and hermetically sealed, which keeps it in the proper condition and prevents it from deterioration or losing its properties.

I am aware that all the ingredients have been used before separately, and some of them together, but not as a whole, as herein described. Therefore,

What I claim is—

In a prescription for hog-cholera and other diseases, madder, sulphur, saltpeter, black antimony, asafetida, lard, turpentine, and tar, in about the proportions set forth.

In testimony whereof I affix my signature in presence of two witnesses.

EDWARD H. ROBERTS.

Witnesses:
 G. A. BOYDEN,
 JNO. T. MADDOX.